(12) United States Patent
Runge et al.

(10) Patent No.: US 7,552,632 B2
(45) Date of Patent: Jun. 30, 2009

(54) RAINDROP SENSOR FOR AN IRRIGATION SYSTEM

(75) Inventors: Thomas H. Runge, Manasquan, NJ (US); Larry Kent Hopkins, Escondido, CA (US); Michael James Grundy, Phelan, CA (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 11/835,866

(22) Filed: Aug. 8, 2007

(65) Prior Publication Data

US 2008/0034859 A1   Feb. 14, 2008

Related U.S. Application Data

(60) Provisional application No. 60/821,797, filed on Aug. 8, 2006.

(51) Int. Cl.
*G01W 1/00* (2006.01)
(52) U.S. Cl. .................. 73/170.17; 73/170.16
(58) Field of Classification Search .. 73/170.01–170.17
See application file for complete search history.

(56) References Cited

U.S. PATENT DOCUMENTS

| | | | |
|---|---|---|---|
| 3,808,385 A | 4/1974 | Klinefelter | |
| 4,064,507 A | 12/1977 | Schmitz | |
| 4,264,902 A | 4/1981 | Miller | |
| 4,396,149 A | 8/1983 | Hirsch | |
| 4,684,920 A | 8/1987 | Reiter | |
| 4,760,547 A | 7/1988 | Duxbury | |
| 4,916,642 A | 4/1990 | Kaiser et al. | |
| 4,922,433 A | 5/1990 | Mark | |
| 5,087,886 A | 2/1992 | Mann | |
| 5,101,083 A | 3/1992 | Tyler et al. | |
| 5,104,045 A | 4/1992 | Kah, Jr. | |
| 5,299,742 A | 4/1994 | Han | |
| 5,333,785 A | 8/1994 | Dodds et al. | |
| 5,355,122 A | 10/1994 | Erickson | |
| 5,424,649 A | 6/1995 | Gluck et al. | |
| 5,465,904 A | 11/1995 | Vaello | |
| 5,499,024 A | 3/1996 | Germanton et al. | |
| 5,526,982 A | 6/1996 | McKenzie | |
| 5,598,977 A | 2/1997 | Lemme | |
| 5,740,038 A | 4/1998 | Hergert | |
| 5,813,606 A | 9/1998 | Ziff | |
| 5,821,864 A | 10/1998 | Knop et al. | |
| 5,853,122 A | 12/1998 | Caprio | |
| D407,656 S | 4/1999 | Klever | |
| 6,005,517 A | 12/1999 | Friedrichs | |
| 6,126,093 A | 10/2000 | Grether et al. | |
| 6,314,340 B1 | 11/2001 | Mecham et al. | |
| 6,452,499 B1 * | 9/2002 | Runge et al. ................. 340/601 |

(Continued)

OTHER PUBLICATIONS

Davis Instruments, Vantage Pro Catalog, 2 pages (no date).

(Continued)

*Primary Examiner*—Andre J Allen
*Assistant Examiner*—Jermaine Jenkins
(74) *Attorney, Agent, or Firm*—Inskeep IP Group, Inc.

(57) ABSTRACT

The present invention describes a rain sensor that counts water drops with a microcontroller. After a predetermined threshold of water drops have been counted, the rain sensor interrupts an irrigation schedule of an irrigation controller.

18 Claims, 11 Drawing Sheets

U.S. PATENT DOCUMENTS

| | | | |
|---|---|---|---|
| 6,570,109 | B2 | 5/2003 | Klinefelter et al. |
| 6,634,225 | B1 * | 10/2003 | Reime .................... 73/170.17 |
| 6,768,422 | B2 * | 7/2004 | Schofield et al. ............ 340/602 |
| 6,907,787 | B2 * | 6/2005 | Cook et al. .................... 73/700 |
| 7,286,935 | B2 * | 10/2007 | Aspola et al. .................. 702/3 |
| 2001/0049563 | A1 | 12/2001 | Addink et al. |
| 2002/0029111 | A1 | 3/2002 | Peek et al. |

OTHER PUBLICATIONS

Hunter® Wireless Rain-Clik™ Rain Sensors Catalog, 2 pages (no date).

R&D Engineering, Inc., New Plus+ Model Catalog, 2 pages (no date).

Rain Bird, Maxicom Central Control System, Jun. 1994, pp. 2-8, Rain Bird Sales, Inc., US.

Rain Bird, Components of the Maxicom System, Feb. 9, 1994, p. 3.2, Section 3,US.

Rain Bird, Maxicom Guide to Operations, Chapter 7, Oct. 1994, US.

Rain Bird, Maxicom Central Computer Control System, "Landscape Irrigation Products, 1993-1994 Catalog," pp. 98-99, US.

Rain Bird, Maxicom Central Control System Guide to Operations, Table of Contents and pp. 5.4-1-2; 5.4-41-42; 7.2-1-2, Rain Bird Sales, Inc., US.

* cited by examiner

RAINDROP SENSOR FOR AN IRRIGATION SYSTEM

RELATED APPLICATIONS

This application claims priority to U.S. Provisional Application Ser. No. 60/821,797 filed Aug. 8, 2006, entitled Rain Drop Sensor for an Irrigation System, the contents of which are hereby incorporated by reference.

BACKGROUND OF THE INVENTION

Automatic irrigation systems such as those employed for landscape and agricultural watering are well known in the art. Typical irrigation systems use a means of controlling the watering cycles via a programmable irrigation controller.

However, user programmed irrigation schedules often require additional environmental information to accurately provide a desired amount of water to the irrigation zone. More specifically, irrigation schedules more accurately maintain a desired soil moisture level when they are responsive to precipitation, high wind and freezing temperature situations.

The simplest method of suspending an automatic watering cycle in an irrigation system involves the operator manually canceling a cycle at an irrigation controller. Often this method proves to be unreliable and inconvenient due to operator inconsistencies. Often an operator ignores the need to suspend the watering cycle, and/or neglects to resume the watering cycle when required. This may cause over-watering and under-watering of the landscaping.

Rain sensors for irrigation systems are an effective and economical method of conserving water, energy, and costs. One such rain sensor for an irrigation system is described in U.S. Pat. No. 6,452,499, which is incorporated herein by reference. This patent shows an easy to install rain sensor which wirelessly transmits rain sensor data to an irrigation system. A more advanced wireless rain sensor can be seen in U.S. Pub. No. 2006/0100747, the contents of which are incorporated herein by reference.

SUMMARY OF THE INVENTION

In one preferred embodiment according to the present invention, this specification describes a rain sensor that counts water drops with a microcontroller. After a predetermined threshold of water drops have been counted, the rain sensor interrupts an irrigation schedule of an irrigation controller.

BRIEF DESCRIPTION OF THE DRAWINGS

FIG. 2-A illustrates a cross sectional view of the rain sensor from FIG. 1;

FIG. 2-B illustrates a top cross sectional view of the rain sensor from FIG. 1;

FIGS. 3-A through 3-C illustrate preferred embodiments of sensor mechanisms according to the present invention;

FIGS. 6-A through 6-B illustrate preferred embodiments of rain sensor according to a preferred embodiment of the present invention;

FIGS. 7-A through 7-I illustrate preferred embodiments of drop counter mechanisms according to preferred embodiments of the present invention;

DETAILED DESCRIPTION OF THE INVENTION

Figure 1:
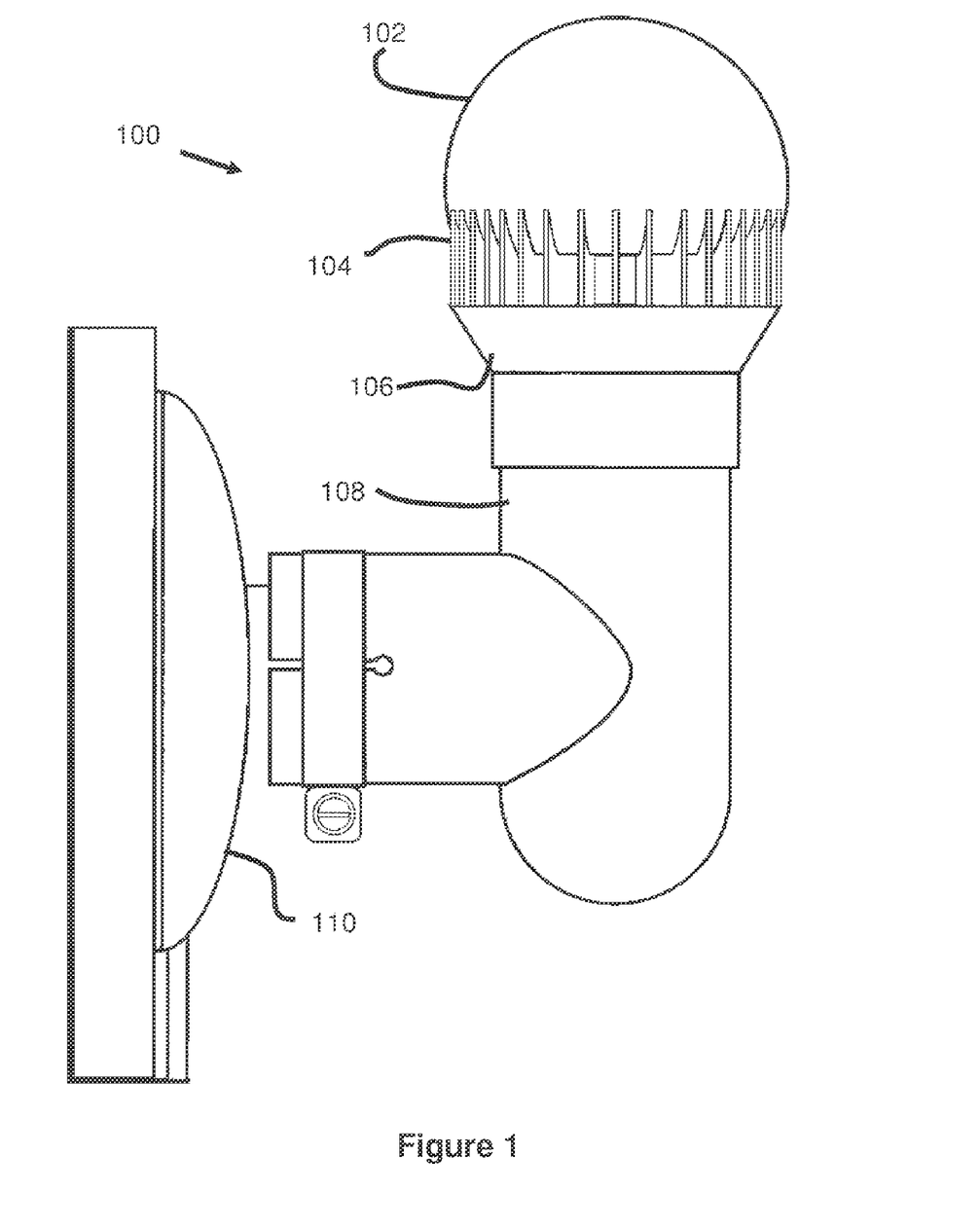
FIG. 1 illustrates a side view of a preferred embodiment of a rain sensor according to the present invention.
Figure 2:
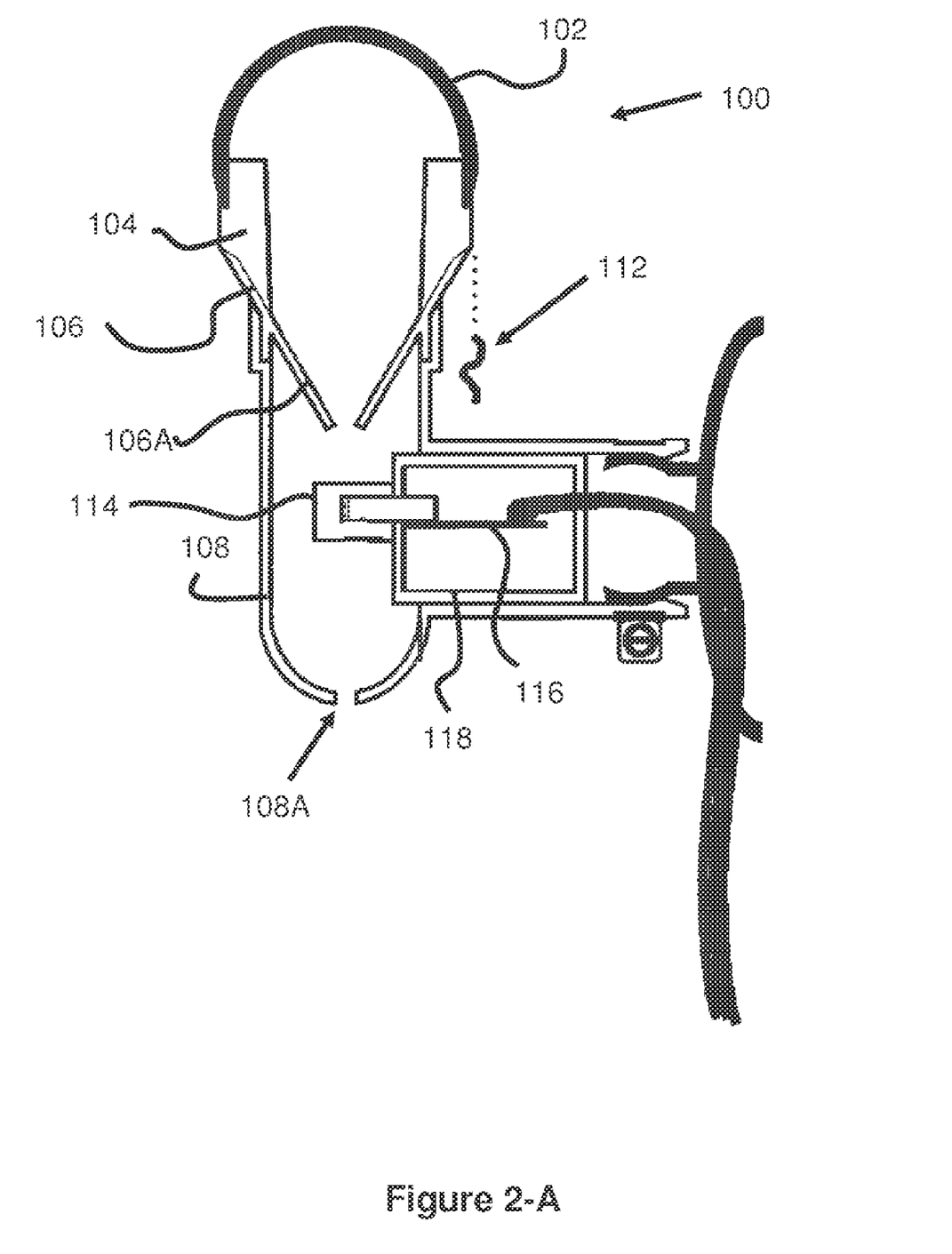

FIGS. 1, 2-A and 2-B illustrates a preferred embodiment of a rain sensor 100 according to the present invention that couples to an irrigation controller (not shown) to interrupt an irrigation schedule. More specifically, the rain sensor 100 measures rainfall or other precipitation by counting individual drops of water.

As seen in these figures, the rain sensor 100 includes a top member 102 having a rounded or spherical shape. The top member 102 is supported by a plurality of fins 104 positioned around at least a portion of the circumference of the top member 102. The fins 104 are also fixed to a collecting member 106 which forms a funnel or conical shaped region 106A in the interior of the body 108 of the rain sensor 100. A sensor 114 is fixed beneath a bottom opening of the collecting member 106 by a bracket 118 and is further connected to a circuit board 116.

In operation, precipitation strikes the top member 102, moving down the side of the top member 102 to the fins 104. The precipitation continues down the fins 104 and onto the conical shaped region 106A of the collecting member 106. The fins 104 help to eliminate any debris 112 (e.g., leaves, bird droppings, etc.) in the precipitation from entering the rain sensor 100. It should be understood that a variety of different fin configurations are possible. For example, the fins 104 can be closely spaced to each other (e.g., 0.25 inch space) or more widely spaced (e.g., 1 inch space). Additionally, the size, number and orientation of the fins 104 can affect the amount of precipitation that enters the rain sensor 100. For example, additional fins 104 may increase the amount of precipitation directed into the rain sensor 100.

The precipitation continues to move down the conical shaped region 106A until it reaches the end of the region 106A. The precipitation then drops on to the sensor 114, registering one "drop" with rain sensor circuitry (described later in this specification).

In an alternate embodiment, the fins 104 may be replaced with a continuous screen or mesh to similarly exclude debris. In another alternate embodiment, the fins 104 may be replace or interspersed with a non cellular foam, a screen or mesh (e.g., a single layer of mesh or multiple layers of mesh that form a lattice structure that provides a path for water) or similar material that holds precipitation until reaching a saturation point. Similarly, non cellular foam or similar materials may be positioned within the rain sensor 100 (e.g., within the conical shaped region 106A or just above the sensor 114) to reduce splashing of the water and to delay or prevent insignificant precipitation from registering with the sensor 114.

Figure 3:
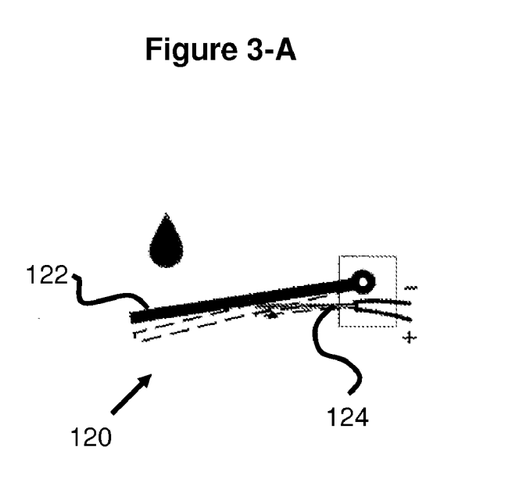

FIGS. 3-A through 3-C illustrate examples of preferred electrical contact sensors 114 that extend away from the circuit board 116. More specifically, FIG. 3-A illustrates lever sensor 120 that includes a mounted lever 122. When a water drop contacts the lever 122, the lever 122 momentarily bends (or pivots against an upward bias) to contact a piezo element 124 which generates an electrical pulse.

FIG. 3-B illustrates a cantilever sensor 130 that includes a conductive cantilever spring 132 and a lower contact 134 positioned beneath the cantilever spring 132. The water drop contacts the cantilever spring 132, momentarily moving the spring 132 into the lower contact 134 and generating a brief electrical pulse through the wires (which are connected to the rain sensor circuitry).

FIG. 3-C illustrates a dual-probe sensor 140 that includes a first conductive probe 142 and a second conductive probe 144 positioned in close proximity to each other so that a water drop falling between the two probes 142 and 144 momentarily creates a conductive path between the two. In this respect, a water drop completes an electrical circuit and generates a short electrical pulse through the wires connected to the rain sensor circuitry.

Figure 4:
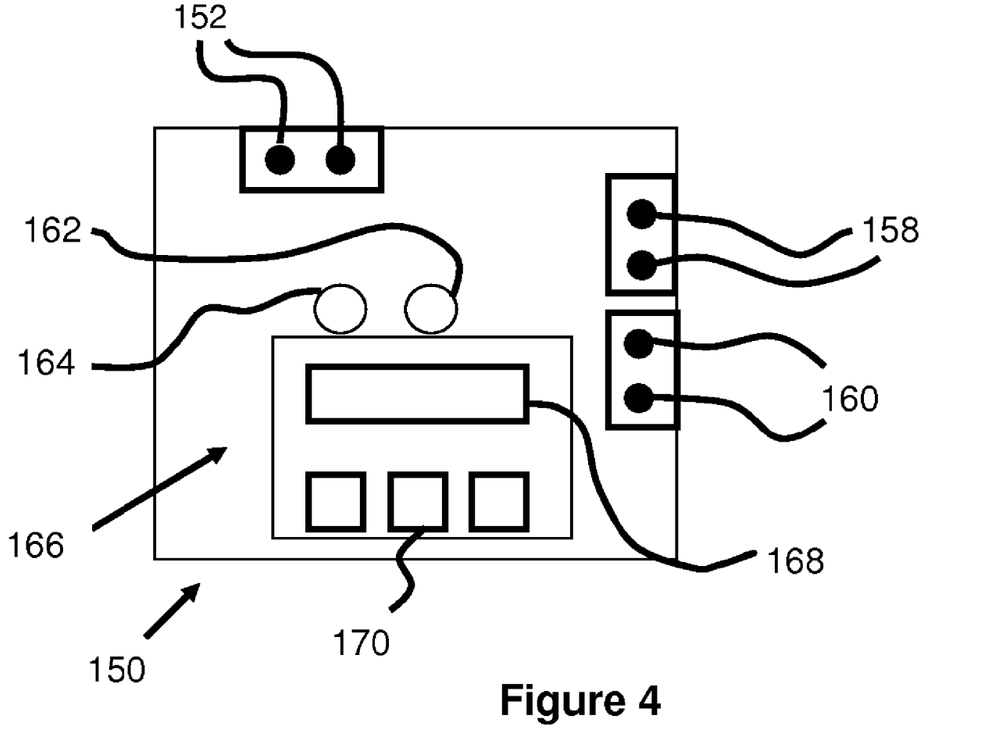
FIG. 4 illustrates a preferred embodiment of an interface on a rain sensor according to the present invention.

The rain sensor circuitry preferably includes a microprocessor either on the circuit board 116 (i.e., integrated with the rain sensor 100) or in a separate rain sensor interface unit 150, seen in FIG. 4. The rain sensor interface unit 150 includes a rain sensor input 152 for connecting to the output wires of a rain sensor, a power input 158 (e.g., a wall transformer input or a 24 VAC power input from a controller) to power the interface unit 150 and a controller connection 160 for coupling to the irrigation controller.

Preferably, the controller connection 160 includes common wire input and common wire output connections which allow the controller connection 160 to connect to the common wire and thereby selectively interrupting the common wire and thereby the irrigation schedule of the controller. Alternately, the controller connection 160 may provide data communication to a custom rain sensor port on the irrigation controller which sends rain data and/or irrigation control commands (e.g., stop irrigation, resume normal irrigation). In another alternate embodiment, the controller connection 160 may have a plurality of input and outputs for interrupting different zones of an irrigation system.

The interface unit 150 further includes a user interface 166 comprising two LEDs 162 and 164, a graphical display 168 and user input buttons 170. These interface elements allow the user to view settings, alerts, and similar functions while adjusting or manipulating sensor settings and other behavior characteristics. It should be understood that the user interface may include fewer or more interface elements, depending on the desired cost and functionality of the rain sensor 100.

Figure 5:
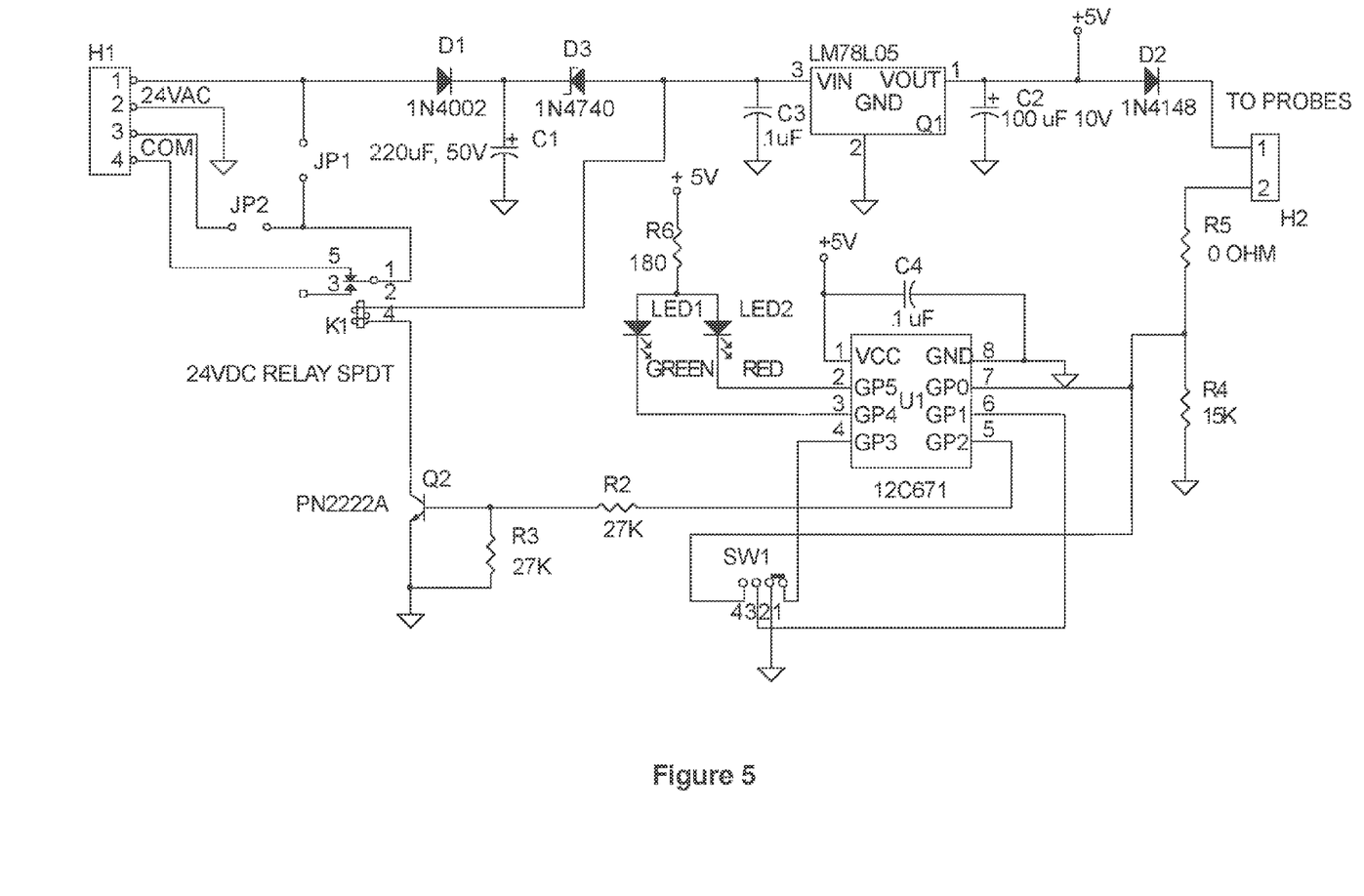
FIG. 5 illustrates a schematic of a printed circuit board according to a preferred embodiment of the present invention.

FIG. 5 illustrates a circuit diagram of an example interface unit 150.

The rain sensor interface unit 150 provides advanced water drop counting and timing functionality for determining when an irrigation schedule should be interrupted. For example, the interface unit (i.e., the sensor circuitry) preferably includes a variable drop threshold that can be manually or automatically determined. The sensor 114 sends water drop signals (e.g., electrical pulses) that are counted by the circuitry (e.g., the microprocessor and memory) Once the water drop threshold is reached, an electronically controlled switch (e.g., for interrupting a "common line" of a system) is activated or a communication signal (e.g., a "stop irrigation command") is sent to the controller, halting the irrigation schedule of the controller. The rain sensor 100 can then continue to count the raindrops or be polled periodically for a system reset (i.e. reestablishing the irrigation schedule).

This rain drop threshold can be set at any desired level to stop irrigation. For example, the threshold can be set to immediately inhibit irrigation after contact with a single drop of water, or can be set to inhibit irrigation after numerous contacts from water drops. Additionally, the threshold can be set to stop irrigation based on the rate of water drops or a combination of the rate and number of water drops measured. Further, the threshold can be measured for a length of time of the precipitation (e.g., raining for 5 minutes). In another example, the threshold can be set at a precipitation measurement (e.g., 2 inches of rain) and the number of rain drops can be used to measure or estimate this value. In another example, any combination of these factors can be used to set a threshold, either manually or automatically.

In some embodiments that include a data connection to the irrigation controller, this precipitation data can be sent to the irrigation controller. For example, the rain sensor interface unit 150 may send the estimated rain amount received for use by the irrigation controller for proportionately reducing the runtime of the irrigation schedule (e.g., if two inches of rain is received, reducing the irrigation runtime by a time equivalent to providing two inches of irrigated water).

Similarly, the length of time of the irrigation interruption can be manually or automatically adjusted. For example, the user may set a specific time value for the interruption to last. Similarly, multiple thresholds and interruption times can be set, for example, providing a relatively short interruption time for light precipitation and a longer interruption time for heavier or longer periods of precipitation.

The rain sensor interface unit 150 can be placed adjacent to an existing irrigation controller for connection to the controller as previously discussed. Alternately, the interface unit can be incorporated into the irrigation controller itself. The interface unit 150 can also be connected to the rain sensor 100 via light weight wires. Alternately, wireless transmitters can be utilized between the rain sensor 100 and the interface unit 150, as seen in U.S. Pat. Nos. 6,452,499 and 7,010,394, the contents of which are hereby incorporated by reference.

In operation, the user connects the rain sensor interface unit 150 to an irrigation system (e.g., to the common line) and optionally determines a precipitation threshold and a precipitation interruption time. Alternately automatic or predetermined thresholds and interruption times may be used. Next, the user mounts the rain sensor 100 at a desired location with no overhead blockages (e.g., roof overhangs, trees, etc.). The user then couples the rain sensor 100 and rain sensor interface together, either by wires or wirelessly. Finally, the user executes an irrigation schedule on the irrigation controller of the irrigation system. During precipitation, water drops fall onto a water drop sensor of the rain sensor 100, registering with the interface unit 150 as a water drop. When the number of water drops equals or exceeds the threshold, the interfaces unit 150 interrupts the irrigation schedule for the duration of the interruption time or alternately waits until the precipitation stops, then continues interruption of the irrigation schedule for the precipitation interruption time.

In an alternate preferred embodiment according to the present invention, the top member 102 and fins 104 of the rain sensor 100 are composed of foam, mesh layers (e.g. a lattice formed from rigid or semi-rigid materials such as metal or plastic) or similar substance as previously described to regulated flow of the precipitation on the sensor 114 within the rain sensor 100. Alternately, the top member can be shaped as solid sphere, a hollow sphere, a solid cone, a hollow cone, or other shapes. In another alternate preferred embodiment according to the present invention, the top member 102 and optionally the fins 104 can be covered in a layer of foam, mesh layers, or similar material to prevent some impacting precipitation from bouncing off the top member 102.

Figure 6:
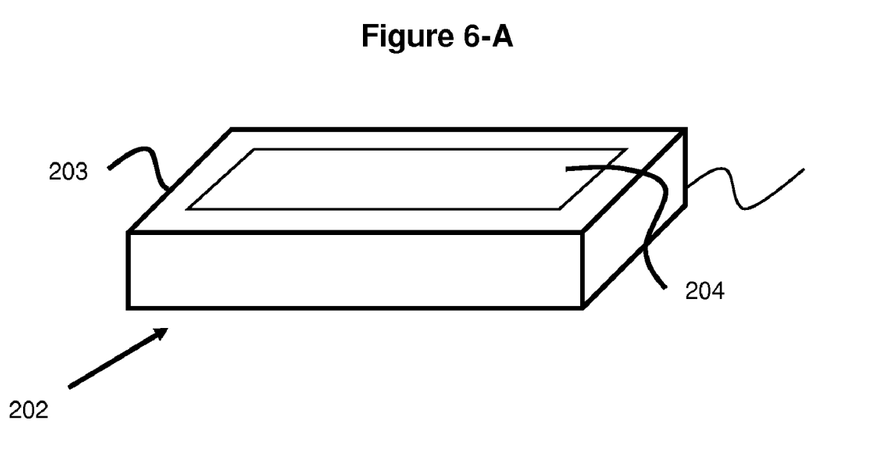

FIGS. 6-A and 6-B illustrate two alternate preferred embodiments of rain sensors according to the present invention. Both rain sensors 202 and 205 include a printed circuit board (PCB) water drop sensors that can be created by binding a conductive material to a substrate using standard printed circuit board fabrication techniques. The substrate can be a rigid or flexible material such as standard FR4 fiberglass or polymer based. A conductive pattern is applied to the substrate using PCB fabrication technology and in such a pattern that allows for the detection of a water droplet as the water droplet traverses the surface of the substrate.

In one preferred embodiment, this PCB sensor may be positioned in a location similar to the sensor 114 in the rain sensor 100. In another preferred embodiment of FIG. 6-A, this PCB sensor may be located in a rain sensor 202 having a top, open aperture 204 in the sensor housing 203 that exposes the PCB sensor. Rain drops may directly fall on the PCB sensor, then drain out through a drainage aperture in the bottom of the housing 203. As the rain drops touch the contacts, they complete the circuit of the sensor, sending an electrical pulse to the interface unit 150 to be counted as a "drop". Alternately, the top, open aperture 204 may be covered with fins, a screen, mesh or a non cellular foam to block debris and prevent insignificant precipitations signals (in the case of the foam).

In another preferred embodiment of FIG. 6-B, the rain sensor 205 includes a PCB sensor 206 located on an outer, angled surface of the sensor housing 207. As rain contacts the PCB sensor 206, it moves down the angled surface. When the drop touches two contacts of the sensor 206, it momentarily completes a circuit in the rain sensor 205, sending an electric pulse to the previously described interface unit 150.

The PCB sensor may have a single circuit (i.e., two contacts) or multiple circuits (e.g., 3, 4, 5, etc.) for additional sensing. As with the previously described water sensors in this specification, this electrical connection is monitored by a microprocessor. The design of the conductive pattern in combination with the angle, shape and substrate material may allow the microprocessor to determine the size (volume) of the water droplet as various circuits are completed at various times via the water as it drips, runs or flows over the substrate surface. For example, the contacts for different circuits may be spaced progressively closer or further together so that as a rain drop rolls across the contacts, it will only complete certain circuits, depending on the contacts distance from each other.

Some advantages of incorporating the contacts on the printed circuit board may include: low cost of manufacture due to utilizing standard PCB fabrication techniques; complex conductive trace patterns are possible; precious metals are used resulting in longer trace life; rigid and flexible substrates allowing for optimal final product integration; multiple conductive patterns possible; operation electronics may also be located on substrate further reducing manufacturing costs.

Figure 7:
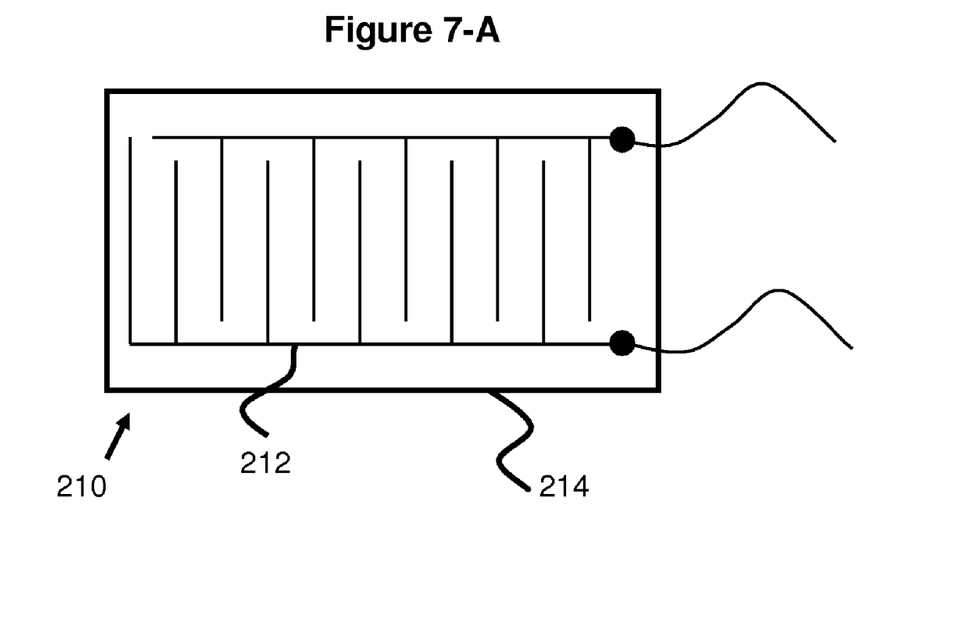
Figures 1, 7:
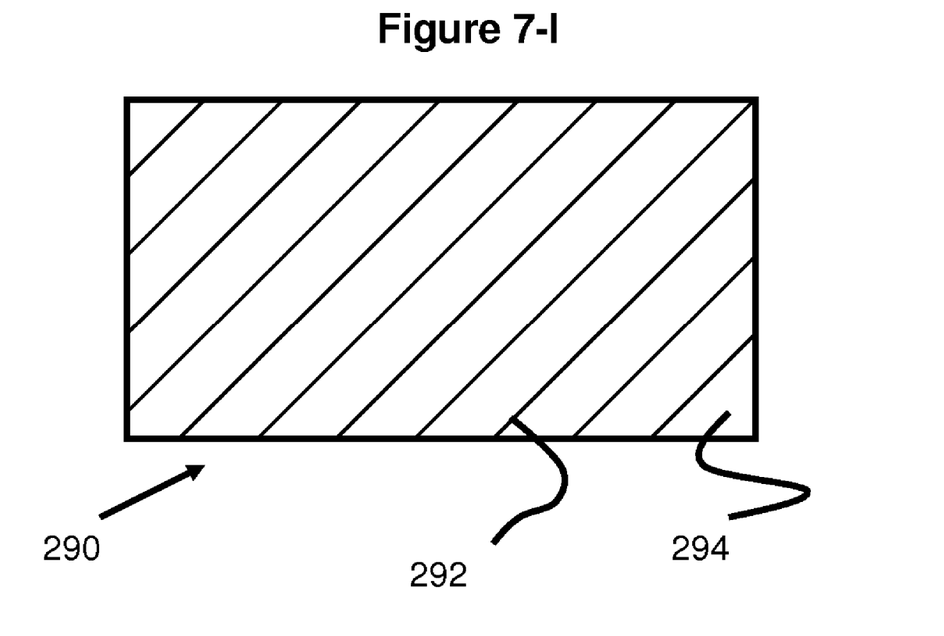

FIGS. 7-A through 7-I illustrate various example embodiment of PCB sensor designs according to the present invention. Turning first to FIG. 7-A, a PCB sensor 210 comprises a rectangular, rigid substrate 214 with integrated contacts 212 forming a single circuit.

FIG. 7-B illustrates a PCB sensor 220 having a similar rigid substrate 224 and contacts 222. Further, sensor circuitry 226 is also located on the substrate 224 and can be sealed in a moisture protective coating or enclosure.

FIG. 7-C illustrates a PCB sensor 230 having a rigid "L" shaped substrate with contacts 232 positioned along the inner bend. When properly positioned (e.g., with the substrate surfaces at about 45 degrees), the "L" shape of the substrate 234 funnels water drops towards the center bend and along the length of the bend (i.e., over the contacts 232).

FIG. 7-D illustrates a PCB sensor 240 having a curved substrate 244 with a plurality of contacts 242 positioned along the length of the substrate 244. The substrate 244 can be rigid (i.e., holding the curve shape on its own) or flexible, being held in the curved shape by a support structure. The PCB sensor 240 is preferably mounted at an angle so that water rolls down the side, curved portions and along the length of the base, off of the substrate 244. Preferably, the contacts 242 are positioned in the direction of the curve so that water drops touch the contacts 242 as they roll down the substrate, similar to a rain gutter. Alternately, the contacts 242 can be positioned perpendicular to the substrate curve or at an angle to the curve.

FIG. 7-E illustrates a flexible PCB sensor 250 having a flexible substrate 254 with a plurality of contacts 254. The flexibility of the substrate 254 allows a user or designer to arrange the PCB sensor 250 in a variety of different conformations or positions.

FIG. 7-F illustrates a cone-shaped PCB sensor 260 having a cone shaped substrate 264 with a plurality of individual circular contacts 262 on the inner surface of the substrate 264. Preferably, the PCB sensor 260 includes a drainage hole or open bottom end to allow for water drainage.

FIG. 7-G illustrates a tubular-shaped PCB sensor 270 having a tubular substrate 274 with a plurality of individual contacts 272 along the inner substrate surface. Like other PCB sensors described in this specification, the PCB sensor 270 can be mounted at an angle between 0 and 90 degrees so that precipitation can enter the sensor 270 and roll down past the contacts 272.

FIG. 7-H illustrates a PCB sensor 280 having a rectangular substrate 284 and spiral contacts 282. While illustrated as a single line, the contacts 282 may include two closely positioned conductive elements or include interruptions in the spiral that isolate individual contact elements. Alternately, the spiral contacts 282 may have a bulls-eye shape of multiple concentric circles.

FIG. 7-I illustrate a PCB sensor 290 having a rectangular substrate 294 and a plurality of individual diagonal contacts 292 that are each connected to a plurality of different circuits. As with previously described PCB sensors, the contacts 292 may be positioned at an equal distance from each other or at different distances to measure rain drop size as previously mentioned (i.e., two contacts will only measure drops of a certain size or larger depending on the contact distance).

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A precipitation sensor for an irrigation system comprising:
   a housing for receiving precipitation;
   a sensing element disposed in said housing to contact said precipitation; said sensing element comprising a substrate and at least two electrical contacts at least partially exposed from said substrate to sense precipitation;
   a microprocessor in communication with said sensing element; and
   an irrigation schedule interruption mechanism operatively coupled to said microprocessor for selectively interrupting an irrigation schedule of said irrigation system.

2. The precipitation sensor of claim 1, wherein a shape of said substrate is selected from a group comprising: a rectangle plane, a curved plane; a bent plane; a funnel; and a cylinder.

3. The precipitation sensor of claim 2, wherein said at least two contacts further comprise a plurality of contacts.

4. The precipitation sensor of claim 3, wherein each of said plurality of contacts are evenly spaced from each other.

5. The precipitation sensor of claim 3, wherein said plurality of contacts are unevenly spaced from each other.

6. The precipitation sensor of claim 1, wherein said irrigation interruption mechanism is selected from a group consisting of: a switch and a communication module.

7. The precipitation sensor of claim 1, wherein said housing further comprises a surface positioned to be in direct exposure to precipitation; said sensing element disposed on said surface.

8. A precipitation sensor for an irrigation controller comprising:
    a first enclosure;
    a precipitation detection sensor coupled to said first enclosure;
    circuitry in communication with said precipitation detection sensor for processing precipitation signals from said precipitation detection sensor and interrupting an irrigation schedule executed on said irrigation controller
    wherein said first enclosure further comprises a collecting member that directs precipitation to drip on a single location above said precipitation detection sensor.

9. The precipitation sensor of claim 8, wherein said circuitry is disposed in a second enclosure, distinct from said first enclosure.

10. The precipitation sensor of claim 9, wherein said circuitry is in communication with said precipitation detection sensor by a communication link selected from a group consisting of a wire and a wireless communications system.

11. The precipitation sensor of claim 8, wherein said circuitry further comprises a switch connected to a common wire of said irrigation system.

12. The precipitation sensor of claim 8, wherein said first enclosure further comprises a rounded surface disposed over a sloped surface.

13. The precipitation sensor of claim 8, wherein said circuitry further comprises a microprocessor and a memory for executing an irrigation threshold.

14. A method of interrupting an irrigation system comprising:
    providing an irrigation controller coupled to at least one sprinkler;
    coupling a precipitation sensor to said irrigation controller;
    directing water drops from precipitation on to a drop sensor;
    completing an electrical circuit with said drop sensor during contact with said water drops;
    counting a number of circuit completions of said electrical circuit with a microprocessor;
    comparing said number of circuit completions of said electrical circuit with a predetermined threshold;
    interrupting an irrigation schedule on said irrigation controller when said number of circuit completions is greater than or equal to said threshold.

15. The method of claim 14, wherein said completing an electrical circuit with said drop sensor during contact with said water drops further comprises completing an electrical circuit between two contacts disposed on a substrate.

16. The method of claim 14, wherein said comparing said number of circuit completions of said electrical circuit with a predetermined threshold further comprises determining said predetermined threshold via a user interface.

17. The method of claim 14, wherein said completing an electrical circuit with said drop sensor further comprises completing said electrical circuit with a drop sensor selected from the following group: a lever sensor, a spring sensor, a conductive probe sensor and a printed circuit board sensor.

18. The method of claim 14, wherein said comparing said number of circuit completions of said electrical circuit with a predetermined threshold further comprises comparing said number of circuit completions of said electrical circuit with a plurality of predetermined thresholds wherein each of said plurality of thresholds executes a different irrigation interruption time period.

* * * * *